(12) United States Patent
Bouws et al.

(10) Patent No.: US 11,898,480 B2
(45) Date of Patent: *Feb. 13, 2024

(54) METHODS AND SYSTEMS FOR REMOVING DEPOSITS IN AN AFTERTREATMENT SYSTEM TO MINIMIZE VISIBLE SMOKE EMISSIONS

(71) Applicant: Cummins Inc., Columbus, IN (US)

(72) Inventors: Todd C. Bouws, Columbus, IN (US); Ankit Raghunath Lad, Columbus, IN (US); Joshua A. Lantz, North Vernon, IN (US); Boopathi Singalandapuram Mahadevan, Columbus, IN (US); Ian W. McGiffen, Scipio, IN (US); Douglas A. Roxbury, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,241

(22) Filed: Sep. 2, 2022

(65) Prior Publication Data

US 2022/0412238 A1 Dec. 29, 2022

Related U.S. Application Data

(63) Continuation of application No. 16/608,295, filed as application No. PCT/US2018/029283 on Apr. 25, 2018, now Pat. No. 11,434,797.

(Continued)

(51) Int. Cl.
*F01N 3/00* (2006.01)
*F01N 3/025* (2006.01)
(Continued)

(52) U.S. Cl.
CPC .............. *F01N 3/025* (2013.01); *F01N 3/24* (2013.01); *F01N 9/002* (2013.01); *F01N 13/009* (2014.06);
(Continued)

(58) Field of Classification Search
CPC . F01N 3/025; F01N 3/24; F01N 9/002; F01N 13/009; F01N 2900/1606; F02D 41/04; F02D 41/16; F02D 2200/0812
See application file for complete search history.

(56) References Cited

U.S. PATENT DOCUMENTS

| 5,195,485 A | 3/1993 | Jensen et al. |
| 6,598,387 B2 | 7/2003 | Carberry et al. |

(Continued)

FOREIGN PATENT DOCUMENTS

| JP | 2009-174340 | 8/2009 |
| WO | WO-2007/145553 | 12/2007 |

OTHER PUBLICATIONS

Final Office Action on U.S. Appl. No. 16/608,295 dated Jul. 8, 2021.
(Continued)

*Primary Examiner* — Matthew T Largi
(74) *Attorney, Agent, or Firm* — FOLEY & LARDNER LLP

(57) ABSTRACT

Systems and methods for removing accumulated soot in an aftertreatment system are disclosed herein. A method includes: determining, by a controller, an adsorption amount of soot in an exhaust aftertreatment system; comparing, by the controller, the adsorption amount of soot to a predefined adsorption amount limit; in response to the adsorption amount exceeding the predefined adsorption amount limit, initiating, by the controller, an exhaust cleaning event to remove at least some accumulated soot in the exhaust aftertreatment system; receiving, by the controller, exhaust gas data during the exhaust cleaning event; determining, by the controller, a desorption amount of soot based on the exhaust gas data; comparing, by the controller, the desorp-
(Continued)

tion amount of soot to a predefined desorption limit; and ceasing, by the controller, the exhaust cleaning event based on the comparison.

20 Claims, 9 Drawing Sheets

Related U.S. Application Data

(60) Provisional application No. 62/491,974, filed on Apr. 28, 2017.

(51) Int. Cl.
  *F01N 3/24* (2006.01)
  *F01N 9/00* (2006.01)
  *F02D 41/04* (2006.01)
  *F02D 41/16* (2006.01)
  *F01N 13/00* (2010.01)

(52) U.S. Cl.
  CPC ............ *F02D 41/04* (2013.01); *F02D 41/16* (2013.01); *F01N 2900/1606* (2013.01); *F02D 2200/0812* (2013.01)

(56) References Cited

U.S. PATENT DOCUMENTS

| | | | |
|---|---|---|---|
| 6,725,134 B2 | 4/2004 | Dillen et al. | |
| 7,654,079 B2 | 2/2010 | Ruth et al. | |
| 7,788,911 B2 | 9/2010 | Zhang et al. | |
| 7,854,114 B2 | 12/2010 | England | |
| 8,230,679 B2 | 7/2012 | Frazier et al. | |
| 8,893,474 B2* | 11/2014 | Ikawa | F02D 41/1401 60/285 |
| 2003/0145582 A1 | 8/2003 | Bunting et al. | |
| 2003/0230077 A1 | 12/2003 | Kuboshima et al. | |
| 2004/0123589 A1 | 7/2004 | Ohtake et al. | |
| 2004/0172935 A1 | 9/2004 | Otake et al. | |
| 2006/0096273 A1 | 5/2006 | Soliman et al. | |
| 2009/0293456 A1* | 12/2009 | Rodman | F01N 9/002 60/303 |
| 2010/0229534 A1 | 9/2010 | Matsunaga | |
| 2011/0047982 A1* | 3/2011 | Chen | F01N 9/002 60/286 |
| 2011/0062973 A1* | 3/2011 | Paterson | F02D 41/1466 324/693 |
| 2011/0209460 A1* | 9/2011 | He | F01N 9/002 95/20 |
| 2012/0282159 A1* | 11/2012 | Takayanagi | B01D 46/448 422/107 |
| 2013/0220274 A1 | 8/2013 | Deshpande et al. | |
| 2013/0227933 A1* | 9/2013 | O'Neil | F02D 41/08 60/274 |
| 2014/0331644 A1* | 11/2014 | Kumar | F01N 3/103 60/297 |
| 2015/0211962 A1 | 7/2015 | Sun et al. | |
| 2015/0218999 A1 | 8/2015 | Chen et al. | |
| 2016/0084184 A1 | 3/2016 | Biagini et al. | |
| 2016/0146077 A1* | 5/2016 | Biagini | F02D 41/0245 60/274 |
| 2018/0058296 A1 | 3/2018 | Norton et al. | |

OTHER PUBLICATIONS

International Search Report and Written Opinion for International Application No. PCT/US2018/029283, dated Jul. 20, 2018, 15 pages.
Notice of Allowance on U.S. Appl. No. 16/608,295 dated May 2, 2022.
U.S. Office Action on U.S. Appl. No. 16/608,295 dated Jan. 3, 2022.
U.S. Office Action on U.S. Appl. No. 16/608,295 dated Dec. 24, 2020.

* cited by examiner

METHODS AND SYSTEMS FOR REMOVING DEPOSITS IN AN AFTERTREATMENT SYSTEM TO MINIMIZE VISIBLE SMOKE EMISSIONS

CROSS-REFERENCE TO RELATED APPLICATIONS

This application is a continuation of U.S. patent application Ser. No. 16/608295, filed on Oct. 25, 2019, titled "Methods and Systems for Removing Deposits in an Aftertreatment System to Minimize Visible Smoke Emissions," which is a U.S. national stage application of PCT Application No. PCT/US2018/029283, filed on Apr. 25, 2018, titled "Methods and Systems for Removing Deposits in an Aftertreatment System to Minimize Visible Smoke Emissions," which claims the benefit of and priority to U.S. Provisional Patent Application No. 62/491,974, filed Apr. 28, 2017, titled "Methods and Systems for Removing Deposits in an Aftertreatment System to Minimize Visible Smoke Emissions," all of which are incorporated herein by reference in their entireties.

TECHNICAL FIELD

The present disclosure relates generally to cleaning aftertreatment systems of internal combustion engines.

BACKGROUND

Aftertreatment systems are widely used in internal combustion engine applications for the aftertreatment of engine exhaust gas to meet emissions regulations. For example, diesel oxidation catalysts (DOC), selective catalytic reduction (SCR) devices, and diesel particulate filters (DPF) have been used for handling, reducing, and/or removing pollutants, such as carbon monoxide, nitrogen oxide (NOx), unburned hydrocarbons, sulfur, and soot in the exhaust gas of an engine. However, particulate matter deposits, such as soot, may be detrimental to the functionality of various aftertreatment system components. For example, SCR devices may be subject to deterioration in performance resulting from deposits of urea accumulated on the SCR catalyst. To improve the efficiency of SCR devices and other aftertreatment system components, it is desirable to remove deposits accumulated within the aftertreatment system as well as the upstream exhaust pipes.

SUMMARY

An embodiment relates to an apparatus for removing soot deposits to reduce visible smoke emissions from an engine. The apparatus includes an engine circuit structured to receive data regarding operation of an engine to determine the engine is operating in a low load condition for more than a predefined amount of time. The apparatus also includes a particulate matter circuit structured to receive an indication that the engine is operating in the low load condition for more than the predefined amount of time, and in response: receive data regarding an exhaust flow through an exhaust aftertreatment system coupled to the engine; determine an adsorption rate of soot in the exhaust aftertreatment system based at least partly on the exhaust flow; determine an adsorption amount of soot for a predefined amount of time based on the adsorption rate; compare the adsorption amount of soot to a predefined adsorption amount limit; and, in response to the adsorption amount of soot exceeding the predefined adsorption amount limit, initiate an exhaust cleaning event to remove at least some soot from the exhaust aftertreatment system.

Another embodiment relates to method for removing soot deposits to reduce visible smoke emissions from an engine. The method includes receiving, by a controller, an indication that an engine has been operating in a low load condition for more than a predefined amount of time; in response, determining, by the controller, an adsorption rate of soot in an exhaust aftertreatment system of the vehicle; determining, by the controller, an adsorption amount of soot based on the adsorption rate of soot for a predefined amount of time; comparing, by the controller, the adsorption amount of soot to a predefined adsorption amount limit; and in response to the adsorption amount exceeding the predefined adsorption amount limit, initiating, by the controller, an exhaust cleaning event to remove at least some accumulated soot in the exhaust aftertreatment system.

Yet another embodiment relates to a system comprising a controller. The controller is coupled to an engine and an exhaust aftretreatment system in a locomotive vehicle. According to one embodiment, the controller is structured to: receive an indication that the engine is operating in a low load condition for more than a predefined amount of time; in response, determine an adsorption rate of soot in the exhaust aftertreatment system; determine an adsorption amount of soot based on the adsorption rate of soot for a predefined amount of time; compare the adsorption amount of soot to a predefined adsorption amount limit; and in response to the adsorption amount of soot exceeding the predefined adsorption amount limit, initiate an exhaust cleaning event to remove at least some accumulated soot in the exhaust aftertreatment system.

These and other features, together with the organization and manner of operation thereof, will become apparent from the following detailed description when taken in conjunction with the accompanying drawings.

DETAILED DESCRIPTION

Figure 1:
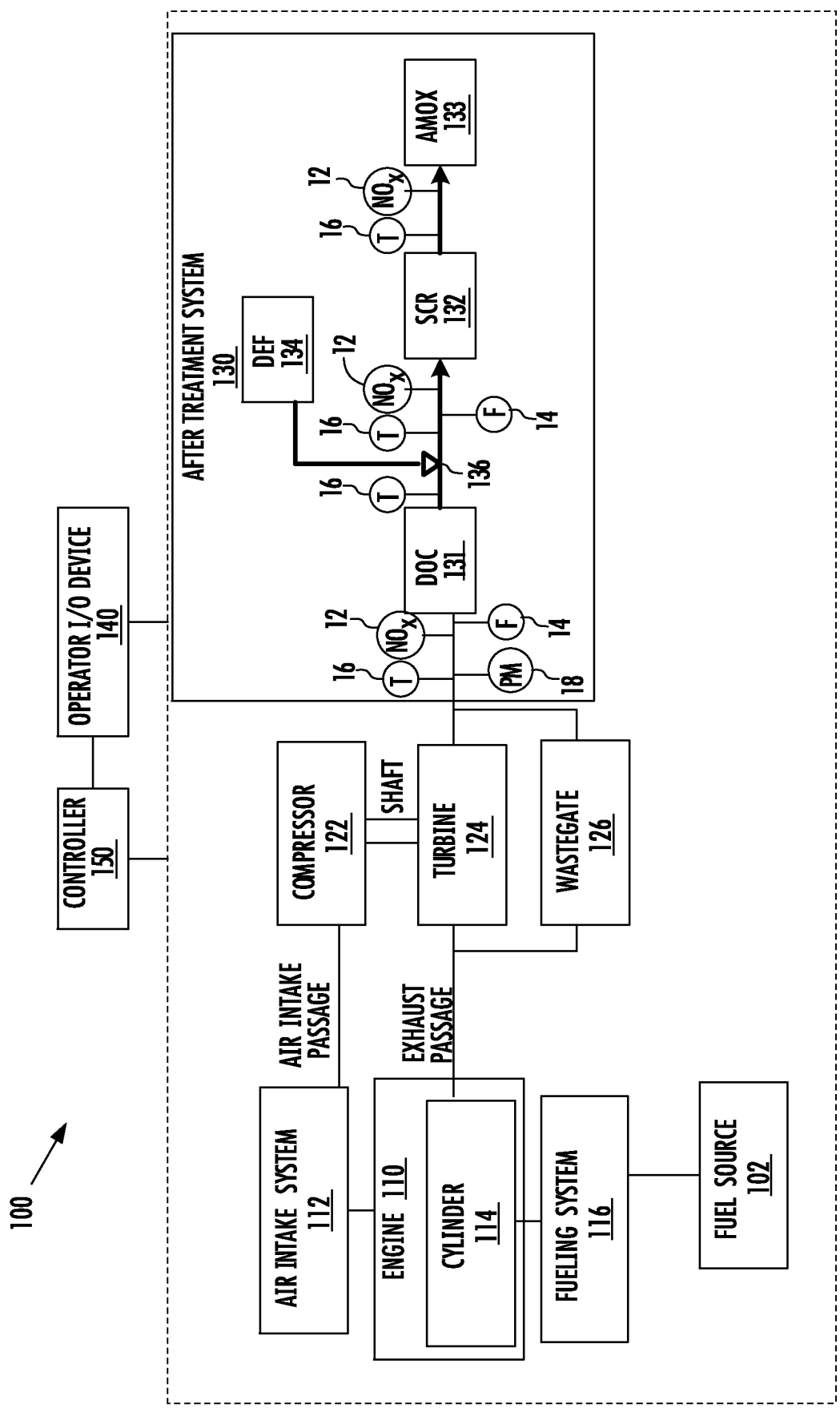
FIG. 1 is a schematic block diagram of a controller coupled to each of an internal combustion engine and an exhaust aftertreament system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, various embodiments disclosed herein relate to systems, methods, and apparatuses for removing deposits in an aftertreatment system for an engine. Aftertreatment systems are used in internal combustion engine applications for the aftertreatment of engine exhaust gas to meet emissions regulations. During engine operation, an SCR device/catalyst may adsorb or accumulate various contaminations in the exhaust stream (e.g., hydrocarbon) and/or the reductant (e.g., urea) used to reduce NOx. Deposits of contaminants on the SCR device may reduce the contact area of the reaction catalyst and the exhaust gas, thus causing deterioration in the SCR device performance. In one particular operational situational, when engines idle for an extended period of time or operate at a low load condition/power output for an extended period of time, particulate matter such as soot accumulates within the aftertreatment system. Among other factors, this accumulation is due to relatively lower exhaust gas temperatures and flows caused by the low load/power output. As a result, when a vehicle, such as a locomotive (which embodies the engine and aftertreatment system) is then moved such that an increase in power output occurs, often, visible smoke is emitted (e.g., black smoke). This is unsightly and contaminates the environment. According to the present disclosure, a system, method, and apparatus are provided for tracking an adsorption rate of particulate matter, namely soot, within an exhaust aftertreatment system, integrating the adsorption rate to determine an adsorption amount, comparing the adsorption amount to a predefined adsorption mass limit, and in response to the comparison indicating that the adsorption amount is at or above the predefined mass limit, causing an exhaust aftertreatment system cleaning event to increase at least one of the exhaust gas flow and temperature in the aftertreatment system to clean out/remove at least some of the accumulated particulate matter deposits from the exhaust aftertreatment system. The systems, methods, and apparatus then monitor the desorption rate to selectively cease the exhaust aftertreatment system cleaning event in order to return the system to a normal operation mode.

Beneficially, the systems, methods, and apparatuses periodically blow out/remove soot deposits to alleviate/reduce visible smoke emissions from the exhaust aftertreatment system. In certain embodiments, one or more alerts, messages, and/or information may be provided to an operator interface device (e.g., a touchscreen, a display screen, etc.) to alert an operator or user of i) the predefined soot accumulation mass limit, ii) an actuator being triggered in connection with the exhaust aftertreatment system cleaning event, iii) an ability to change which actuator is being triggered/operational parameters thereof, iv) the determined adsorption mount, v) the determined desorption amount, and vi) any other information relating to the systems, methods, and apparatuses disclosed herein.

As used herein, the term "particulate matter" refers the particles that are created or otherwise provided as a byproduct of combustion in an internal combustion engine, such as a diesel powered engine. Particulate matter includes soot, aerosols, sulfates, and various other particles. "Soot" refers to impure or burnt primarily carbon particles that are included in the particulate matter. In this regard, soot is primarily responsible for the coloring of emitted smoke from internal combustion engines as black. Accordingly, as used herein, the term "adsorption rate" refers to the rate of accumulation of particulate matter per unit of time at a particular location in the exhaust plumbing downstream of the engine cylinder(s). For example, a sample adsorption rate may be 100 kg/min. Comparatively, the "desorption rate" refers to the rate of removal of particulate matter at a particular location in the exhaust plumbing downstream of the engine cylinder(s). Thus, "adsorption amount" refers to an amount of particulate matter accumulated (the adsorption amount) for a given amount of time while the term "desorption amount" refers to an amount of particulate matter removed (the desorption amount) for a given amount of time. Unless otherwise stated, the adsorption rate, adsorption amount, desorption rate, and desorption rate are in regard to soot deposits as compared to particulate matter generally.

Referring now to FIG. 1, a schematic block diagram of a vehicle 100 with a controller 150 are shown according to an example embodiment. As shown in FIG. 1, the vehicle 100 includes an engine 110, a turbocharger that is shown as a compressor 122 and a turbine 124, an exhaust aftertreatment system 130 fluidly coupled to the engine 110, an operator input/output device 140, and a controller 150 communicably and operatively coupled to the components in FIG. 1. According to one embodiment and as shown, the vehicle 100 is a locomotive that may be coupled to one or more cars to form a train. The locomotive may move along a rail line to and from various destinations to, e.g., deliver freight and transport passengers. Of course, the depicted embodiment is not meant to be limiting as the vehicle 100 may take other forms in other embodiments (e.g., a semi-tractor, a truck, a car, a non-vehicle application such as a power generator, and the like).

Briefly, in the vehicle 100, the engine 110 is charged with air flow by a compressor 122. The air flow mixes with fuel supplied from a fuel source 102. Combustion takes place in the engine 110. Exhaust gas of the combustion is discharged to a turbine 124, which is mechanically coupled to the compressor 122 and drives the compressor 122. A wastegate 126 can enable part of the exhaust gas to bypass the turbine 124, resulting in less power transfer to the compressor 122. A combination of bypass and turbine flow enters the aftertreatment system 130 for aftertreatment before releasing the exhaust gas to the atmosphere.

The engine 110 may be any internal combustion engine (e.g., compression-ignition, spark-ignition) powered by any fuel type (e.g., diesel, ethanol, gasoline, etc.). An example of diesel engine is shown in FIG. 1 for illustration only and not for limitation. The engine 110 includes a cylinder 114. The engine is coupled to an air intake system 112 and a fueling system. Other components of the engine 110 are omitted from explanation herein, such that this description and depiction of the components is not meant to be limiting.

The intake air may first flow through an air cleaner (not shown in the present figure) disposed upstream of the compressor 122 and structured to purify the intake air. The compressor 122 may compress the cleaned air, thus increasing the temperature and pressure of the air flow. The compressed air may then be aspirated into the air intake system 112 of the engine 110 through an air intake passage. In some embodiments, a charge air cooler (not shown) is disposed on the air intake passage and structured to cool the air to increase the air density. In some embodiments, the air intake system 112 includes an air intake manifold, an air intake throttle, and/or an air intake valve structured to control access of the air to the one or more cylinders 114.

The fueling system 116 of the engine 110 is structured to supply fuel to the one or more cylinders 114 from the fuel source 102 (e.g., fuel tank). In some embodiments, the fueling system 116 includes a fuel pump, one or more fuel lines (or a common rail system), and one or more fuel injectors. Fuel may be suctioned from the fuel source 102 by the fuel pump and fed to the common rail system, which distributes fuel to the fuel injectors for each cylinder. Fuel can be pressurized to control the pressure of the fuel delivered to the cylinders. It shall be understood that any suitable connection arrangement with fuel source, injection location, and/or injector type can be used to provide fuel directly and/or indirectly to the cylinders.

The engine 110 may include one or multiple cylinders 114. Each cylinder may include a combustion chamber in which the compressed fuel-air mixture ignites, and a piston structured to move within the combustion chamber to facilitate the combustion process.

Burnt products of the combustion process (i.e., exhaust gas) may be discharged from the engine 110 and expelled into the turbine 124 through the exhaust passage. The turbine 124 is mechanically coupled to the compressor 122 through, for example, a shaft. As briefly mentioned above, the turbine, shaft, and compressor form a turbocharger. The exhaust gas discharged from the engine 110 may drive the turbine 124 to rotate, which may in turn drive the compressor to compress the air supplied to the engine 110. The wastegate 126 can enable part of the exhaust gas to bypass the turbine 124. As a result, less exhaust gas energy is available to the turbine 124, less power is transferred to the compressor 122, and the air flow is supplied to the engine 110 at a lower rate. Reducing a rate of the air flow at the same power level lowers the air to fuel ratio in the cylinder, which might result in an increase in the exhaust gas temperature. The wastegate 126 may be an open-close valve, or a full authority valve. In some embodiments, the wastegate 126 is integrated into the turbine 124. In some embodiments, the turbine 124 is a variable geometry turbine (VGT) with an adjustable inlet to control the flow of exhaust gas therethrough.

A combination of bypass flow and turbine flow may enter the aftertreatment system 130 for aftertreatment. The aftertreatment system 130 is structured to transform/reduce the environmentally harmful emissions from the engine 110, including for example, carbon monoxide, NOx, hydrocarbons, and/or soot. As shown and in exhaust gas flow direction, the aftertreatment system 130 includes a diesel oxidation catalyst (DOC), a selective catalytic reduction device 132, and an ammonia oxidation catalyst/device (133). Exhaust gas flowing through the AMOx catalyst 133 may be emitted to the environment or provided to another component before eventual emission to the environment. The system 130 further includes a reductant delivery system that has a diesel exhaust fluid (DEF) source 134 that supplies DEF to a DEF doser 136 via a DEF line. It should be understood that the depicted catalytic device(s)/components are not meant to be limiting as the present disclosure contemplates the inclusion of various other catalytic device(s)/components as well including, but not limited to, a three-way catalyst (TWC), a lean NOX trap (LNT), etc. Additionally, the aftertreatment system 130 (as well as the remaining parts of the vehicle 100) may include one or more sensors (described below) that are real or virtual (i.e., not a physical sensor, but an algorithm, process, or method for determining a data value) that can be disposed in a variety of positions throughout the vehicle 100. The sensors are described below. Further, the aftertreatment system may include an exhaust gas recirculation loop as well. Thus, those of ordinary skill in the art will appreciate and recognize the high configurability of the exhaust aftertreatment system 130 of the present disclosure, with all such variations intended to fall within the scope of the present disclosure.

Notably, however, the exhaust aftertreatment system 130 does not include a particulate filter. In certain applications, diesel particulate filters (DPF) are used to catch or trap particulate matter. The filters then are periodically regenerated (i.e., heated to a high temperature) to burn off the trapped particulate filter. However, in the example depicted, the particulate matter, such as soot, is not trapped. Rather, the particulate matter can accumulate in various locations in the system 130, such as the SCR 132. It should be understood that while the systems, methods, and apparatuses disclosed herein are primarily directed to non-DPF exhaust aftertreatment systems, the present disclosure contemplates inclusion with DPF exhaust aftertreatment systems.

Further and in one embodiment, which is in contrast to that shown in FIG. 1, the DOC 131 is excluded from the aftertreatment system 130 thereby leaving the DEF dosing system, SCR and AMOx devices. Additionally, the PM sensor 18 may also be excluded. Thus, those of ordinary skill in the art will appreciate and recognize the highly variable structural configuration of the system 130 with all such variations intended to fall within the scope of the present disclosure.

Components in the aftertreatment system can be arranged in any suitable manner. In the aftertreatment system 130 shown in FIG. 1, the DOC 131 is disposed upstream of the SCR device 132. Further, the reductant delivery device 136 is disposed between the DOC 131 and the SCR device 132. This depiction is not meant to be limiting as other types of arrangements are contemplated.

The DOC 131 may have any of various flow-through designs. Generally, the DOC 131 is structured to oxidize at least some particulate matter, e.g., the soluble organic fraction of soot, in the exhaust and reduce unburned hydrocarbons and CO in the exhaust to less environmentally harmful compounds. For example, the DOC 131 may be structured to reduce the hydrocarbon and CO concentrations in the exhaust to meet the requisite emissions standards for those components of the exhaust gas. DOC 131 may include, for example, palladium, platinum and/or aluminum oxide which serve as a catalyst to oxidize the hydrocarbons and carbon monoxide with oxygen to form carbon dioxide and water.

The SCR device 132 may include a reduction catalyst that facilitates conversion of NOx to $N_2$ by a reductant. In some embodiments, the SCR device 132 includes a vanadia catalyst. In other embodiments, the SCR device 132 includes zeolite, base metals, and/or any other suitable type of reduction catalyst. The reductant used to convert $NO_x$ to $N_2$ includes, for example, hydrocarbon, ammonia, urea, diesel exhaust fluid (DEF), or any suitable reductant. The reductant may be injected into the exhaust flow path by the reductant delivery device 136 in liquid and/or gaseous form, such as aqueous solutions of urea, ammonia, anhydrous ammonia, or other reductants suitable for SCR operations.

The AMOx catalyst 133 may be any of various flow-through catalysts configured to react with ammonia to produce mainly nitrogen. The AMOx catalyst 133 is structured to remove ammonia that has slipped through or exited the SCR catalyst 132 without reacting with NOx in the exhaust. In certain instances, the exhaust aftertreatment system 130 may be operable with or without an AMOx catalyst. Further, although the AMOx catalyst 133 is shown as a separate unit from the SCR catalyst 132 in FIG. 1, in some implementations, the AMOx catalyst 133 may be integrated with the SCR catalyst 132, e.g., the AMOx catalyst and the SCR catalyst can be located within the same housing.

As discussed above, the SCR system may include a reductant delivery system with a reductant (e.g., DEF) source 134, a pump and a delivery mechanism or doser 136. The reductant source 136 can be a container or tank capable of retaining a reductant, such as, for example, ammonia ($NH_3$), DEF (e.g., urea), or diesel oil. The reductant source 134 is in reductant supplying communication with the pump, which is configured to pump reductant from the reductant source to the delivery mechanism 136 via a reductant delivery line. The delivery mechanism 136 is positioned upstream of the SCR catalyst 132. The delivery mechanism 136 is selectively controllable, by the controller 150, to inject reductant directly into the exhaust gas stream prior to entering the SCR catalyst 132.

As also shown, a plurality of sensors are included in the exhaust aftertreatment system 130. The sensors may be in communication with the controller 150, such that the controller 150 can monitor and acquire data indicative of operation of the system 130. In this regard, the system 130 includes NOx sensors 12, flow rate sensors 14, temperature sensors 16, and particulate matter sensors 18. The NOx sensors 12 acquire data indicative of or, if virtual, determine a NOx amount at or approximately at their disposed location. The flow rate sensors 14 acquire data indicative of or, if virtual, determine an approximate flow rate of the exhaust gas at or approximately at their disposed location. The temperature sensors 16 acquire data indicative of or, if virtual, determine an approximate temperature of the exhaust gas at or approximately at their disposed location. The particulate matter sensors acquire data indicative of or, if virtual, determine an approximate amount of particulate matter flowing in the exhaust gas at or approximately at their disposed location at a given sampling time. It should be understood that the depicted locations, numbers, and type of sensors is illustrative only. In other embodiments, the sensors may be positioned in other locations, there may be more or less sensors than shown, and/or different/additional sensors may also be included with the system 130 (e.g., a pressure sensor, etc.). Those of ordinary skill in the art will appreciate and recognize the high configurability of the sensors in the system 130.

The operator I/O device 140 may enable an operator of the vehicle 100 (or passenger or manufacturing, service, or maintenance personnel) to communicate with the vehicle 100 and the controller 150. By way of example, the operator I/O device 140 may include, but is not limited to, an interactive display, a touchscreen device, one or more buttons and switches, voice command receivers, and the like. For example, information relating to the data/information acquired by the controller 150 or operations/commands provided by the controller 150 to control or manage one or more components (e.g., engine 110) may be provided to an operator or user via the operator I/O device 140.

The controller 150 may be structured as one or more electronic control units (ECU). As such, the controller 150 may be separate from or included with at least one of a transmission control unit, an exhaust aftertreatment control unit, a powertrain control module, an engine control module, etc. The function and structure of the controller 150 is described in greater detail in FIG. 2.

Figure 2:
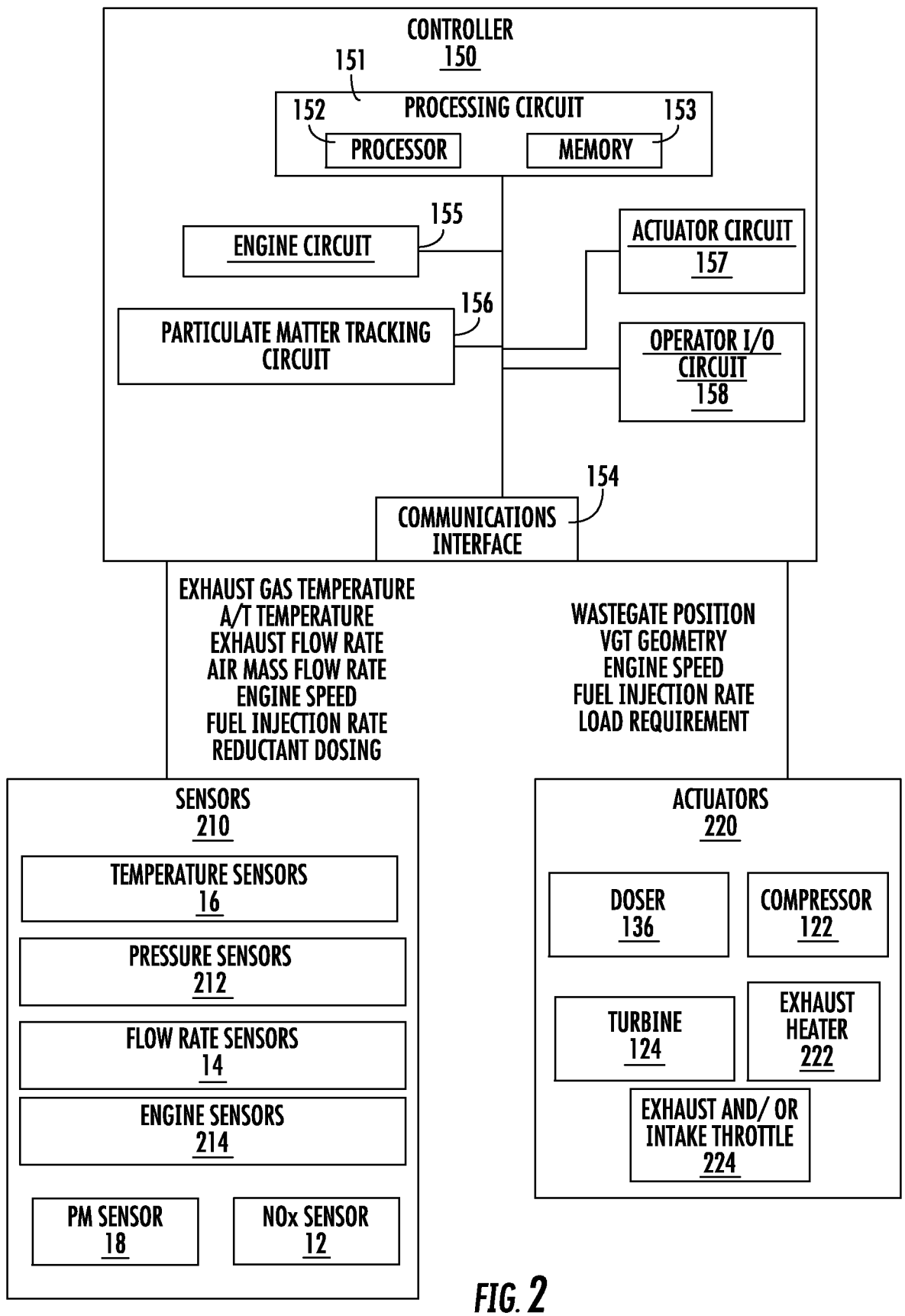
FIG. 2 is a schematic block diagram of the controller of FIG. 1, according to an example embodiment.

Referring now to FIG. 2, a schematic diagram of the controller 150 of the vehicle 100 of FIG. 1 is shown according to an example embodiment. As shown in FIG. 2, the controller 150 includes a processing circuit 151 having a processor 152 and a memory 153; an engine circuit 155, a particulate matter tracking circuit 156, an actuator circuit 157, an operator input/output (I/O) circuit 158, and a communications interface 154, whereby all of these components are coupled to each other. As described herein, the controller 150 is structured to track a particulate matter accumulation amount within the exhaust aftertreatment system 130, determine that the particulate matter accumulation amount is greater than or equal to a predefined limit, and actuate an exhaust cleaning event (also referring to herein as an "exhaust aftertreatment system cleaning event"). During the exhaust cleaning event, the controller 150 is structured to track the particulate matter desorption amount, determine that the particulate matter desorption amount is greater than or equal to a desired desorption amount (i.e., desorption limit), and cease the exhaust cleaning event.

In one configuration, the engine circuit 155, particulate matter tracking circuit 156, actuator circuit 157, and operator I/O circuit 158 are embodied as machine or computer-readable media that is executable by a processor, such as the processor 152. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine circuit 155, particulate matter tracking circuit 156, actuator circuit 157, and operator I/O circuit 158 are embodied as hardware units, such as electronic control units. As such, the engine circuit 155, particulate matter tracking circuit 156, actuator circuit 157, and operator I/O circuit 158 may be embodied as one or more circuitry components including, but not limited to, processing circuitry, network interfaces, peripheral devices, input devices, output devices, sensors, etc. In some embodiments, the engine circuit 155, particulate matter tracking circuit 156, actuator circuit 157, and operator I/O circuit 158 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine circuit 155, particulate matter tracking circuit 156, actuator circuit 157, and operator I/O circuit 158 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, engine circuit 155, particulate matter tracking circuit 156, actuator circuit 157, and operator I/O circuit 158 may also include programmable hardware devices such as field programmable gate arrays, programmable array logic, programmable logic devices or the like. In this regard, the engine circuit 155, particulate matter tracking circuit 156, actuator circuit 157, and operator I/O circuit 158 may include one or more memory devices for storing instructions that are executable by the processor(s) of the engine circuit 155, particulate matter tracking circuit 156, actuator circuit 157, and operator I/O circuit 158. The one or more memory devices and processor(s) may have the same definition as provided below with respect to the memory 153 and the processor 152. Thus, in this hardware unit configuration, the engine circuit 155, particulate matter tracking circuit 156, actuator circuit 157, and operator I/O circuit 158 may be geographically dispersed throughout separate locations in the vehicle 100. Alternatively and as shown, the engine circuit 155, particulate matter tracking circuit 156, actuator circuit 157, and operator I/O circuit 158 may be embodied in or within a single unit/housing, which is shown as the controller 150.

In the example shown, the controller 150 includes the processing circuit 151 having the processor 152 and the memory 153. The processing circuit 151 may be structured or configured to execute or implement the instructions, commands, and/or control processes described herein with respect to the engine circuit 155, particulate matter tracking circuit 156, actuator circuit 157, and operator I/O circuit 158. Thus, the depicted configuration represents the aforementioned arrangement where the engine circuit 155, particulate matter tracking circuit 156, actuator circuit 157, and operator I/O circuit 158 are embodied as machine or computer-readable media. However, as mentioned above, this illustration is not meant to be limiting as the present disclosure contemplates other embodiments such as the aforementioned embodiment where the engine circuit 155, particulate matter tracking circuit 156, actuator circuit 157, and operator I/O circuit 158 are configured as a hardware unit or multiple hardware units. All such combinations and variations are intended to fall within the scope of the present disclosure.

The processor 152 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the engine circuit 155, particulate matter tracking circuit 156, actuator circuit 157, and operator I/O circuit 158 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 153 (e.g., RAM, ROM, Flash Memory, hard disk storage, etc.) may store data and/or computer code for facilitating the various processes described herein. The memory 153 may be communicably connected to the processor 152 to provide computer code or instructions to the processor 152 for executing at least some of the processes described herein. Moreover, the memory 153 may be or include tangible, non-transient volatile memory or non-volatile memory. Accordingly, the memory 153 may include database components, object code components, script components, or any other type of information structure for supporting the various activities and information structures described herein.

The communications interface 154 of the controller 150 may facilitate communication between and among the controller 150 and one or more components of the vehicle 100 (e.g., engine 110, the operator I/O device 140, various sensors 210, actuators 230, etc.). Communication between and among the controller 150 and the components of the vehicle 10 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Before turning to the specifics of the controller 150, as shown, the controller 150 is communicably coupled to the sensors 210 and actuators 220. Note that this is depiction is not meant to be limiting as FIG. 1 clearly shows that that controller 150 may be coupled to other components of the vehicle 100 as well, such as the engine 110. That said, the controller 150 may control one or more of the sensors 210 and the actuators 220 as well as the other components, such as the engine 110, turbocharger, operator I/O device 140, etc.

The sensors 210 are structured to acquire and/or generate data indicative of various operating parameters of the engine application system (e.g., the vehicle 100 of FIG. 1). The controller 150 can receive the data from the sensors 210, process the data to create corresponding commands, and send the commands to the actuators 220. As shown, the sensors 210 include temperature sensors 16, pressure sensors 212, flow rate sensors 14, engine sensors 214, PM sensors 18, and NOx sensors 12. Similar to the sensors 12, 14, 16, and 18, the pressure sensors 212 and engine sensors 214 may be real or virtual, may be numerous or only one of each, and may be disposed in one or more locations within the vehicle 100. The engine sensor 214 is structured to acquire or determine data indicative of operation of the engine 110. The operational data regarding the engine 110 may include, but is not limited to, a fuel injection rate/amount, a combustion timing, a combustion temperature and pressure, an engine speed, an engine torque, a power output and load, a rail pressure in the fueling system, and so on. The pressure sensors 212 are structured to acquire or determine data indicative of a pressure in the vehicle 100 at or approximately at the disposed location of the pressure sensors 212 (e.g., upstream or downstream of the SCR, etc.).

The actuators 220 refer to various components in the vehicle 100. As shown, the actuators 220 include the DEF doser 136, the turbo charger (e.g., compressor 122 and turbine 124), wastegate 126, an exhaust heater 222, exhaust or intake throttle 224, and the like. That said, the controller 150 is coupled to other components of the vehicle 100, such that the controller 150 can control, at least partly, certain operational parameters of those components, such as the fueling system 116 and the engine 110. As described herein, the controller 150 may selectively cause or initiate an exhaust cleaning event, whereby the particulate matter, namely soot, deposits are blown out. To accomplish this exhaust cleaning event, the controller 150 may control operation of at least one of the aforementioned actuators, the engine 110, fueling system 116, a combination thereof, etc. For example, the controller 150 may do any of the following alone, or in combination, with each other: increase engine speed, increase engine load, increase an exhaust throttle opening to increase the volume and flow rate of exhaust gases downstream of the engine 110 (e.g., through the exhaust aftertreatment system 130), increase an intake throttle opening to increase the charge air to increase the combustion volume and exhaust gases flowing downstream of the engine 110, turn on an exhaust gas heater to heat the exhaust gases flowing downstream of the engine 110, utilize an alternate combustion strategy to cause an increase in exhaust gases flowing downstream of the engine 110 (e.g., adjust the timing of the fuel injection or the amount, perform a post-combustion injection to increase combustion temperatures, etc.), adjust the position of the turbocharger to increase the amount of exhaust gases or pressure thereof flowing into the exhaust aftertreatment system 130, adjust the timing of the dosing event, and the like. Increasing engine speed and/or load could be via any one or more of via a dynamic braking grid (electric drive mobile applications, hydraulic pumps, coolant pumps, air compressor, etc. Thus, in operator, the controller 150 manages, handles, or otherwise controls one or more actuators to increase exhaust flow or space velocity to clean stored soot (i.e., particulate matter deposits) from the exhaust plumbing downstream of the cylinders in response to the engine being operated for prolonged periods of low load (e.g., at an idle). This actuation to increase exhaust flow or space velocity is referred to herein as the "exhaust cleaning event," which, as such, may include any one or more of the aforementioned events.

Turning now to the specifics of the controller 150, the engine circuit 155 is structured to receive data regarding operation of the engine 110 (and fueling system 116). In response or independent thereof, the engine circuit 155 is structured to control, at least partly, operation of the engine 110 and fueling system 116. As described above, control of the engine 110 and fueling system 116 may include, but is not limited to, adjusting an engine speed, adjusting an engine load, adjusting fueling parameters (e.g., fuel timing, fuel injection amount, etc.), etc. Therefore, data regarding operation of the engine 110 and fueling system 116 may include, but is not limited, a current engine speed, a current or past engine load, a current or past engine temperature and pressure, a current or past fueling rate or amount, and the like. In one embodiment, the engine circuit 155 tracks and monitors the time duration regarding how long the engine 110 has been operating a predefined condition, such as a low load condition. In one embodiment, the low load condition refers to an engine speed of less than or equal to 1300 revolutions-per-minute (RPM) for greater than or equal to a predefined time threshold (e.g., 7 minutes) over a predefined time duration (e.g., 4-8 hour period). Thus, this "low load" condition may represent an idle period. Additionally, this "low load" condition indicates that the exhaust gas flowrate through the aftertreatment system 130 (and otherwise in the exhaust plumbing downstream of the cylinders) has been relatively low for this predefined time duration, which means that particulate matter, such as soot, may be building up within the system.

The particulate matter tracking circuit 156 is structured to selectively track and monitor an adsorption rate and desorption rate to determine amount of particulate matter at a particular location in the exhaust plumbing downstream of the engine 110 cylinders. As such, the particulate matter tracking circuit 155 is structured to receive data regarding operation of the exhaust aftertreatment system 130. The data may include temperature data indicative of a temperature within the exhaust aftertreatment system 130. The data may include an exhaust flow rate regarding a flow rate of exhaust through the exhaust aftertreatment system 130 or at a particular location within the system 130. The data may include a particulate matter amount at or approximately at a particular at particular location in the system 130 at a particular time (e.g., the sampling time). The data may further include various other operating parameters regarding the exhaust aftertreatment system 130, such that the aforementioned list is not meant to be limiting.

In one embodiment, the adsorption rate is determined in response to determining a low load condition for greater than or equal to a predefined amount of time. For example, if the low load condition (e.g., idling) has been occurring for greater than or equal to seven minutes, the particulate matter tracking circuit 156 is structured to determine an adsorption rate. In another embodiment, the adsorption rate may be determined based on an explicit instruction received from an operator or a user. In yet another embodiment, the adsorption rate may be determined according to a different predefined schedule or rule.

The adsorption rate may be determined as follows. The particulate matter tracking circuit 156 receives data regarding an exhaust flow rate at the inlet of the SCR 132. Determination of the flow rate may be based on the flow sensor 18. The particulate matter tracking circuit 156 also receives an exhaust gas temperature in the system 130; and, in this embodiment, the temperature is indicative of an inlet temperature to the SCR 132. Of course, in other embodiments, a different location for determining/using the exhaust gas temperature may be used. Using a table (which could also be a formula, algorithm, process, and the like) where the two data points of temperature and flow correspond to a predetermined adsorption rate, the particulate matter tracking circuit 156 determines an adsorption rate. As mentioned above, the adsorption rate refers the accumulation amount of particulate matter, namely soot, per unit of time. The particulate matter tracking circuit 156 may then use an integrator function to determine an estimated accumulation amount of soot. For example, if the determined adsorption rate is 10 kg/min. and the integrator utilizes a 30 minute time duration, the determine accumulation amount of particulate matter is 300 kg.

In another configuration, the particulate matter tracking circuit 156 utilizes particulate matter information in combination with exhaust flow to determine an adsorption rate. This process is similar to the above process except the two data points that are used to determine the adsorption rate are a determined particulate matter amount and an exhaust gas flow rate. Again, a table, such as a look-up table, may be utilized to then determine the adsorption rate.

In each of these configurations, the particulate matter tracking circuit 156 utilizes a two-dimensional process to determine the adsorption rate (i.e., the temperature data and the flow rate). According to another embodiment, a one-dimensional process is utilized. For example, the particulate matter tracking circuit 156 may solely examine, track, or otherwise monitor the flow rate to determine an adsorption rate. In this case, a correlation function may be utilized: for example, at a flow rate of X kg/min., the adsorption is Y, etc.

In yet another embodiment, the particulate matter tracking circuit 156 utilizes a three-dimension process to determine adsorption rate. In one embodiment, the particulate matter tracking circuit 156 utilizes data or information relating to exhaust flow, particulate matter information, and temperature data such as the SCR 132 inlet temperature to determine an adsorption rate at these conditions. Similar to the two-dimensional concept, here, the particulate matter tracking circuit 156 may utilize a table or look-up table to determine adsorption rate given these three input conditions.

In a similar vein, the particulate matter tracking circuit 156 is structured to selectively determine a desorption rate. In one embodiment, the desorption rate is determined in response to initiation of the exhaust cleaning event. In another embodiment, the desorption rate is determined in response to receipt of an explicit instruction from a user (e.g., via the operator I/O device 140). As mentioned above, the "desorption rate" refers to the rate of removal of particulate matter, namely soot, at a particular location in the exhaust plumbing downstream of the engine cylinder (e.g., 1 kg/min. is currently being removed at a particular location). The determination of the desorption rate may be akin to that of the adsorption rate, such that the determination may be based on one data point (e.g., exhaust flow rate), two data points (exhaust flow rate and exhaust gas temperature, such as SCR inlet temperature), three data points (exhaust flow rate, SCR inlet temperature, and particulate matter amount), etc. Thus, the particulate matter tracking circuit 156 may utilize a look-up table or another process or formula to determine the desorption rate given various data conditions. For example, at a flow rate of X and an SCR inlet temperature of Y, the desorption rate is Z (which is based on a look-up table).

According to one embodiment, the table used to determine the adsorption and desorption rates is based on at least one of experimental and simulated data. In this regard, the table is a listing of parameters or conditions (e.g., flow rate and SCR inlet temperature) that correspond to a certain adsorption or desorption rate or range of rates. In other embodiments, different mechanisms may be used rather than or in addition to the look-up table described herein.

Appreciably and because operating conditions (e.g., exhaust flow rate) can change dynamically and quickly, the particulate matter tracking circuit 156 may utilize a buffer to account for such changes. For example, rather than examining an instantaneous flow rate, the circuit 156 may examine an average flow rate for the past predefined time period, or the circuit 156 may only examine the flow rate once every predefined amount of time (e.g., once every five minutes). Such a buffer may reduce memory and computing requirements to technically improve operation of controller 150 and circuit 156. The buffer may be applied to determine either one or both of the adsorption and desorption rates.

It should be understood that while the temperature data point mentioned above is with respect to the SCR inlet (and flow rate data point), in other configurations, the temperature data point may be excluded or determined at other positions within the system 130 such that this description is not meant to be limiting.

Using the adsorption rate or desorption rate, the particulate matter tracking circuit 156 is structured to determine an adsorption amount and a desorption amount, respectively, per a predefined amount of time. As alluded to above, the particulate matter tracking circuit 156 may include an integrator. The integrator may be preprogrammed with a pre-defined desired amount of time, which may be adjusted by an operator via the I/O device 140. While the predefined amount of time may vary, an example operation is provided as follows: if the adsorption rate is 10 g/min., and the predefined amount of time is 3 hours, then the adsorption amount is 180 grams (60 min./hour*3 hour*10 g/min.). A similar calculation may be employed with the desorption rate.

In one embodiment, the predefined amount of time used to determine the adsorption amount is the amount of time that has passed since detection or determination of the low load condition for more than a predefined amount of time. This predefined amount of time may also include a buffer (e.g., +5 minutes, etc.), to make conservative estimates. In another embodiment, the predefined amount of time used to determine the adsorption amount is a user-defined amount of time following the detection of or determination of the low load condition.

In comparison, the predefined amount of time used to the desorption amount is the amount of time that has passed since initiation of the exhaust cleaning event. This pre-defined amount of time may also include a buffer (e.g., +5 minutes, etc.), to make conservative estimates. In another embodiment, the predefined amount of time used to determine the desorption amount is a user-defined amount of time following or substantially following the initiation of the exhaust cleaning event.

Based on the determined adsorption amount or desorption amount, the particulate matter tracking circuit 156 is structured to compare this amount to a predefined adsorption mass limit and a predefined desorption mass limit (also referred to herein as the predefined absorption and desorption limits). The adsorption mass limit refers to a threshold amount of particulate matter that the controller 150 and system 130 are willing to tolerate before initiating an exhaust cleaning event. The desorption mass limit refers to a threshold amount of particulate matter that has been removed from the system 130 that is required before the controller 150 ceases operation of the exhaust cleaning event and the engine 110 and system 130 return back to a normal operation mode. In other words, the adsorption mass limit triggers the exhaust cleaning event while the desorption mass limit triggers cessation of the exhaust cleaning event. Because the engine and aftertreatment system configurations are highly variable, the precise quantifiable parameters representing the adsorption and desorption mass limits are highly configurable with all such variations falling within the scope of the present disclosure.

The actuator circuit 157 is structured to receive data regarding one or more actuators 220 and control, at least partly, operation of the one or more actuators 220. For example, the actuator circuit 157 may control the doser 136, the compressor 122, the turbine 124, the exhaust heater 222, opening/closing of the exhaust and/or intake throttle 224, dynamic braking, etc.

The operator I/O circuit 158 is structured to communicate with the operator I/O device 140 to provide information (e.g., alerts) and receive instructions from an operator or a user. For example, an operator, via the I/O device 140 and circuit 158, may set the predefined adsorption mass limit, the predefined desorption mass limit, and various other predefined thresholds (such as quantities) described herein above. Further, via the I/O device 140 and the circuit 158, a user may explicitly instruct the controller 150 to provide information (e.g., an adsorption amount) and to specifically run the comparison (e.g., determine an adsorption or desorption amount and compare that determination to the predefined mass limit).

In certain embodiments, the operator I/O circuit 158 may provide a notification (e.g., an alert, message, etc.) to the I/O device 140 when the predefined adsorption mass limit is exceeded or close to being exceeded. As such, the user may control when the exhaust cleaning event occurs rather than the exhaust cleaning event occurring automatically. This control may be beneficial depending on the upcoming operating conditions for the locomotive. In another embodiment, the exhaust cleaning event or cessation thereof may occur automatically.

Based on the foregoing, an example operation of the controller 150 may be described as follows. The engine circuit 155 receives data indicate of a low load operating condition for the engine 110 for longer than a predefined time threshold (e.g., greater than 7 minutes). In response, the particulate matter tracking circuit 156 acquires data regarding operation of the exhaust aftertreatment system 130 (e.g., an exhaust flow rate immediately or nearly immediately before the SCR inlet and an SCR inlet temperature) to determine an adsorption rate. The particulate matter tracking circuit 156 then determines an adsorption amount over a predefined time period (e.g., 4 hours), such as via the integrator as described above. The particulate matter tracking circuit 156 compares the adsorption amount to a predefined adsorption mass limit and if the adsorption amount is greater than or equal to the predefined adsorption mass limit, the actuator circuit 157 and/or engine circuit 155 are contacted to initiate the exhaust cleaning event. The exhaust cleaning event may include increase the engine load demand, such as via the engine circuit 155, and any of the aforementioned exhaust cleaning events that increase the exhaust flow downstream of the engine cylinders in order to blow or push the accumulated particulate matter out of the system 130. During the exhaust cleaning event, the particulate matter tracking circuit 156 may determine a desorption rate and using the time duration of the exhaust cleaning event, determine the desorption amount, which can be compared to a predefined desorption amount mass limit to then cause the exhaust cleaning event to end. Beneficially, Applicant has determined that the controller 150 may remove soot deposits more effectively than other systems and methods to reduce the emissions of visible smoke from engine systems that, according to the present disclosure, do not include a particulate filter.

With the above in mind, referring now to FIGS. 3-8, methods for reducing particulate matter deposits in an exhaust aftertreatment system are shown, according to various example embodiments. Method 300 is generic to methods 400, 500, 600, 700, and 800 of FIGS. 4-8. Further, methods 400, 500, 600, 700, and 800 are variations of each other. Additionally, each of methods 300-800 may be implemented with the vehicle 100 (i.e., locomotive) and the controller 150 of FIGS. 1-2. As such, methods 300, 400, 500, 600, 700, and 800 may be described with regard to FIGS. 1-2.

Figure 3:
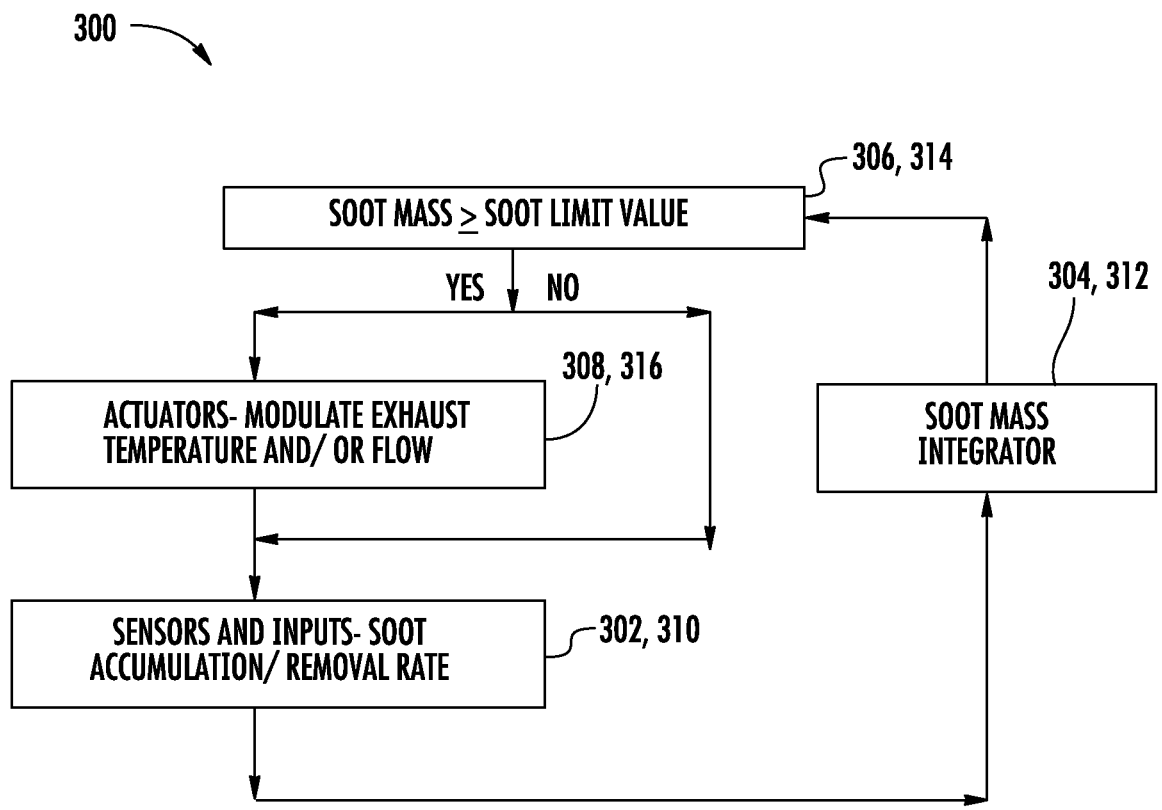
FIG. 3 is a flow diagram of a method for reducing particulate matter deposits in an exhaust aftertreatment system, according to an example embodiment.
Figure 4:
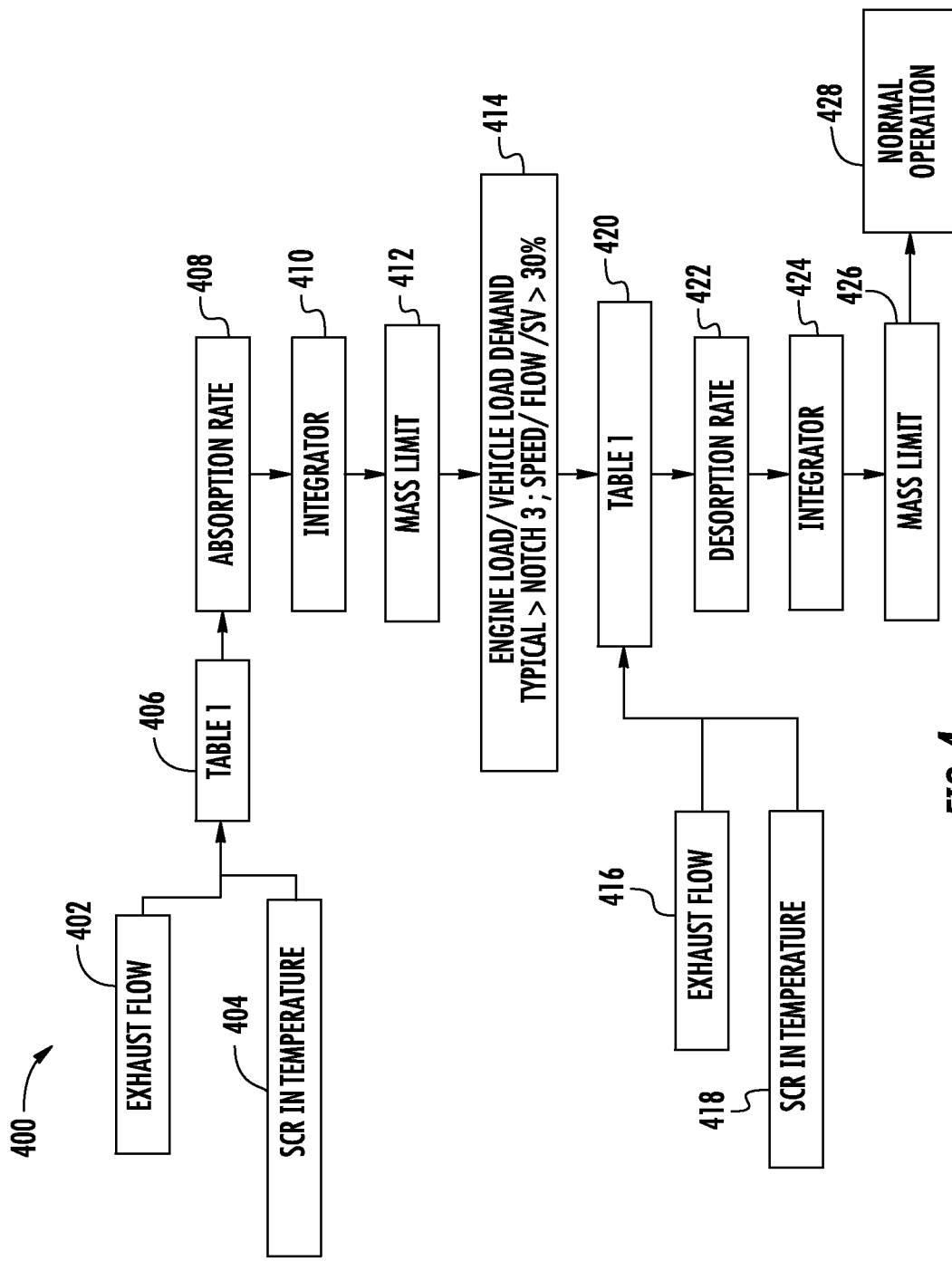
FIG. 4 is another flow diagram of a method for reducing particulate matter deposits in an exhaust aftertreatment system, according to an example embodiment.

Referring first to FIG. 3, at process 302, an adsorption rate of soot in an exhaust aftertreatment system is determined. Process 302 may utilize one or more sensors, such as the flow sensor 14 and the particulate matter sensor 18, to acquire data regarding operation of the aftertreatment system. Using this data, the controller 150 determines the adsorption rate, such as via a look-up table, a formula, an algorithm, and the like. For example, at a flow rate of X, the adsorption rate is Y at a particular location. In one embodiment, process 302 utilizes two data points, such as exhaust flow and exhaust gas temperature (e.g., SCR inlet temperature), to determine the adsorption rate. In other embodiments, more or less than two data points are utilized.

At process 304, the adsorption rate is integrated to determine an adsorption amount. Integration of the adsorption rate provides an estimate for the amount of soot accumulated in the exhaust aftertreatment system 130. The time duration used for the integration is highly configurable, such that this time duration may be predefined by a user or based on a different standard (e.g., the time passed since the start of method 300).

At process 306, the determined soot adsorption amount is compared to a predefined soot adsorption mass limit. As mentioned above, the predefine soot adsorption mass limit is highly configurable and may vary based on each engine application.

At process 308, if the determined soot adsorption amount is greater than or equal to the predefined soot adsorption mass limit, an exhaust cleaning event is initiated. In this regard, the accumulated soot in the system is above a predefined threshold, such that if the engine were started or driven at a higher power output and the soot continued to build-up, the continued build-up of soot would be expelled in a visible amount of smoke that is unsightly. Accordingly, an exhaust cleaning event is initiated to expel or substantially expel the build-up of soot (i.e., the adsorption amount). As mentioned above, the exhaust cleaning event can include modulation of various actuators (e.g., opening/closing of intake and exhaust valves, VGT position, etc.) as well as changing/adjusting the operation of the engine 110 (e.g., commanding an increase in engine load, speed, power output, etc.). In one embodiment, the engine 110 is operated at an increased power output corresponding to approximately 1230 horsepower at 1400 RPM. As a result, the exhaust gas flowing through the exhaust aftertreatment system 130 increases to push, force, or otherwise urge the accumulated soot out of the system 130.

At process 310, a desorption rate is determined. The desorption rate may be determined as described above and generally refers to the rate of removal of the particulate matter, namely soot, from the system 130. The process may then continue as before where the desorption rate is integrated to determine a desorption amount (process 312), the desorption amount is compared to a predefined desorption amount limit (process 314), and if the desorption amount is greater than or equal to the limit (which indicates that the user-defined or manufacturer-defined sufficient amount of soot has been expelled from the system), the exhaust cleaning event is ended (process 316).

Thus, method 300 depicts a continuous cycle for triggering an exhaust cleaning event and ceasing an exhaust cleaning event. It should be understood that the trigger events for starting method 300 are highly configurable. In one embodiment, method 300 is actuated based on an explicit user input. In another embodiment, method 300 is initiated automatically after the controller 150 detects a low load condition for longer than a predefined time duration (e.g., an idle event for more than 7 minutes). As mentioned above, the low load condition means that the exhaust gas flow is relatively lower, such that particulate matter, such as soot, may accumulate. As a result, a subsequent instance of driving the engine may then lead to a blow-out of the accumulated particulate matter, which may be undesirable.

With method 300 in mind, methods 400-800 are specific variations of method 300. Referring first to method 400, at process 402, exhaust flow data is received. At process 404, SCR inlet temperature data is received. At process 408, an adsorption rate is determined based on the exhaust flow data and the SCR inlet temperature using a table (process 406). Thus, in this example, the data used to determine an adsorption rate is two-dimension and includes the exhaust flow and the SCR inlet temperature. Further, the exhaust flow is at or approximately at the SCR inlet. Thus, method 400 is looking at the inlet exhaust flow characteristics to determine adsorption rate. Actual determination of the adsorption rate may be determined as described above with respect to the controller 150 (e.g., using a table based on experimental or simulated data to correlate the two data points to an estimated or determined adsorption rate). In this regard and in other embodiments, different data point(s) may be used (i.e., an exhaust gas temperature at a different location than proximate the SCR inlet, an exhaust flow rate at a location other than the SCR inlet, etc.). Thus and while FIGS. 4-7 show the use of SCR inlet temperature, in other configurations, this data point may be excluded and/or a temperature of the exhaust gas at a different location used. At processes 410-412, an adsorption amount is determined (process 410) and compared to an adsorption mass limit (process 412). Determination of the adsorption amount may be achieved via an integrator (process 410) over a predefined time period, such as when method 400 is initiated or another user defined time frame. If the determined adsorption amount is greater than or equal to the predefined adsorption mass limit, then an exhaust cleaning event is initiated (process 414). In the example shown, the exhaust cleaning event includes increasing engine or vehicle load to increase exhaust flow. The exhaust cleaning event also includes increasing the notch position to greater than or equal to position 3. Notch settings, as used in locomotive, control power output from the engine. Typically, there are 8 notch settings. Increasing the notch level to greater than or equal to 3 increases the power output from the engine.

Upon or shortly after initiation of the exhaust cleaning event, exhaust flow data (process 416) and SCR inlet temperature data (process 418) is received to determine a desorption rate (422) using a table (process 420). Using the desorption rate, a desorption amount is determined using an integrator (process 424) for a predefined time frame (e.g., the time that has passed since the initiation of the exhaust cleaning event, or another predefined time frame). The determined desorption amount is compared to a predefined desorption mass limit (process 426). If the determined desorption amount is greater than or equal to the predefined desorption mass limit (which indicates that a user defined sufficient amount of particulate matter and soot has been expelled from the system), normal operation is initiated (process 428). In this regard, "normal operation" refers to the exhaust cleaning event being ceased and normal operation of the engine system being initiated. Normal operation may be a default setting (e.g., return to an idle, turn the engine off, proceed to a lower notch setting, etc.) or a user-defined setting.

Figure 5:
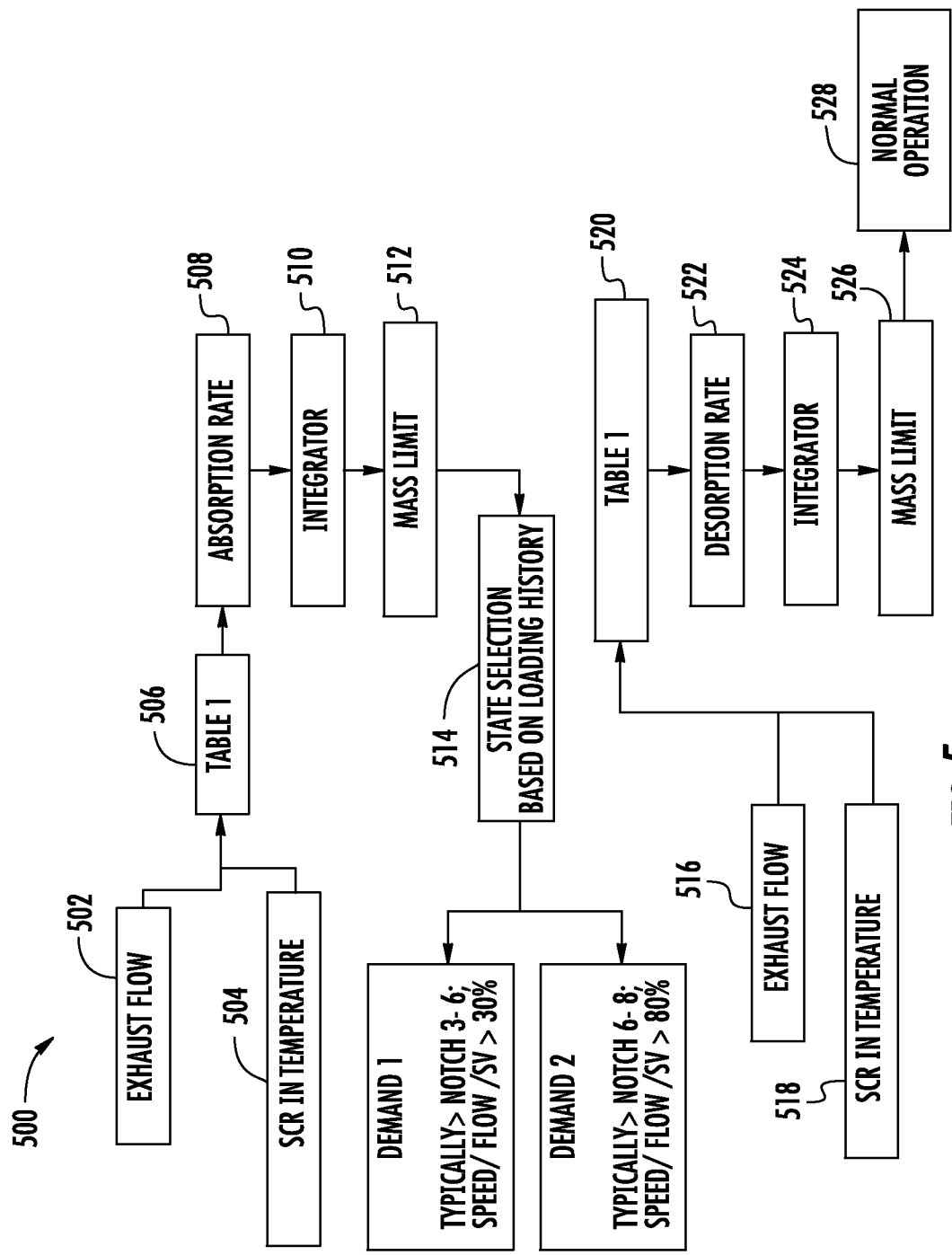
FIG. 5 is still another flow diagram of a method for reducing particulate matter deposits in an exhaust aftertreatment system, according to an example embodiment.

Referring now to FIG. 5, method 500 is shown, which substantially similar to method 400 except for process 514. In this regard, process 502 is analogous to 402, 504 is analogous to 404, 506 is analogous to 406, 508 is analogous to 408, 510 is analogous to 410, 516 is analogous to 416, 518 is analogous to 418, 520 is analogous to 420, 522 is analogous to 422, 524 is analogous to 424, 526 is analogous to 426, and 528 is analogous to 428. Therefore and with reference to process 514, a state selection for an exhaust cleaning event is chosen and initiated. Here, the state selection refers to a exhaust cleaning state event based on the comparison (process 512). For example, if the comparison indicates that the adsorption amount is greater than the predefined adsorption amount mass limit by more than a predefined percentage, amount, or other metric, demand 2 state is initiated. If the comparison indicates that the adsorption amount is greater than the predefined adsorption amount mass limit but less than the predefined percentage, amount, or other metric, demand 1 state is initiated. Demand 1 state corresponds with a relatively less power output/less demanding exhaust cleaning state relative to Demand 2. In this regard and as shown, demand 2 has a notch setting between 6 and 8 while demand 1 has a notch setting between 3 and 6. By utilizing the higher or lower demand states based on the comparison, a better tailoring of exhaust cleaning to the actual or estimated actual accumulation may be achieved to, for example, conserve fuel and otherwise optimize the cleaning of the system 130. It should be understood that the demand states are not meant to be limiting as many other demand states could be implemented. Further, the demarcations used to indicate the higher or lower demand states are highly configurable and may vary from application to application.

Figure 6:
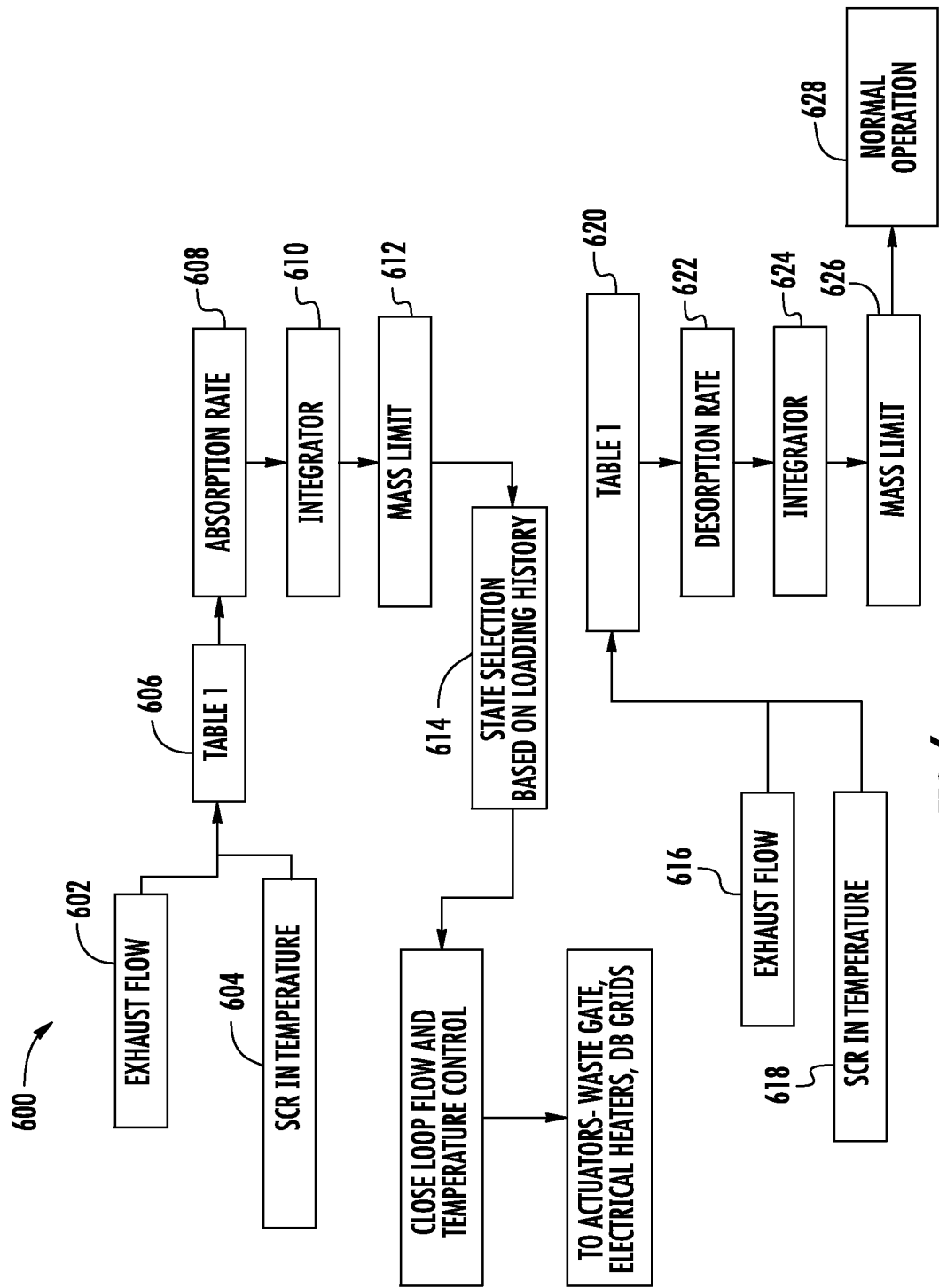
FIG. 6 is yet another flow diagram of a method for reducing particulate matter deposits in an exhaust aftertreatment system, according to an example embodiment.

Referring now to FIG. 6, a method 600 is shown, which substantially similar to method 500 except for process 614. In this regard, process 602 is analogous to 502, 604 is analogous to 504, 606 is analogous to 506, 608 is analogous to 508, 610 is analogous to 510, 616 is analogous to 516, 618 is analogous to 518, 620 is analogous to 520, 622 is analogous to 522, 624 is analogous to 524, 626 is analogous to 526, and 628 is analogous to 528. Therefore and with reference to process 614, a state selection for an exhaust cleaning event is chosen and initiated. Here, the state selection refers to a exhaust cleaning state event based on the comparison (process 612). That said and relative to the state selection of process 514, at process 614, the state selection refers to different exhaust cleaning states than that of process 514. In process 514, mainly, the states were different power outputs from the engine. In process 614, the states are different actuator positions. For example, if the comparison indicates that the adsorption amount is greater than the predefined adsorption amount mass limit by more than a predefined percentage, amount, or other metric, the actuators (such as the intake valve and turbocharger) may be controlled to increase the charge air intake to then increase the exhaust gas flow expulsion. If the comparison indicates that the adsorption amount is greater than the predefined adsorption amount mass limit but less than the predefined percentage, amount, or other metric, then the actuators may be controlled to increase the exhaust gas flow but to a lesser extent than the previous state. Thus and beneficially, different actuator states are utilized to quickly and easily increase the exhaust gas flow to expel the accumulated soot in an efficient manner given the determined or estimated accumulation amount.

Figure 7:
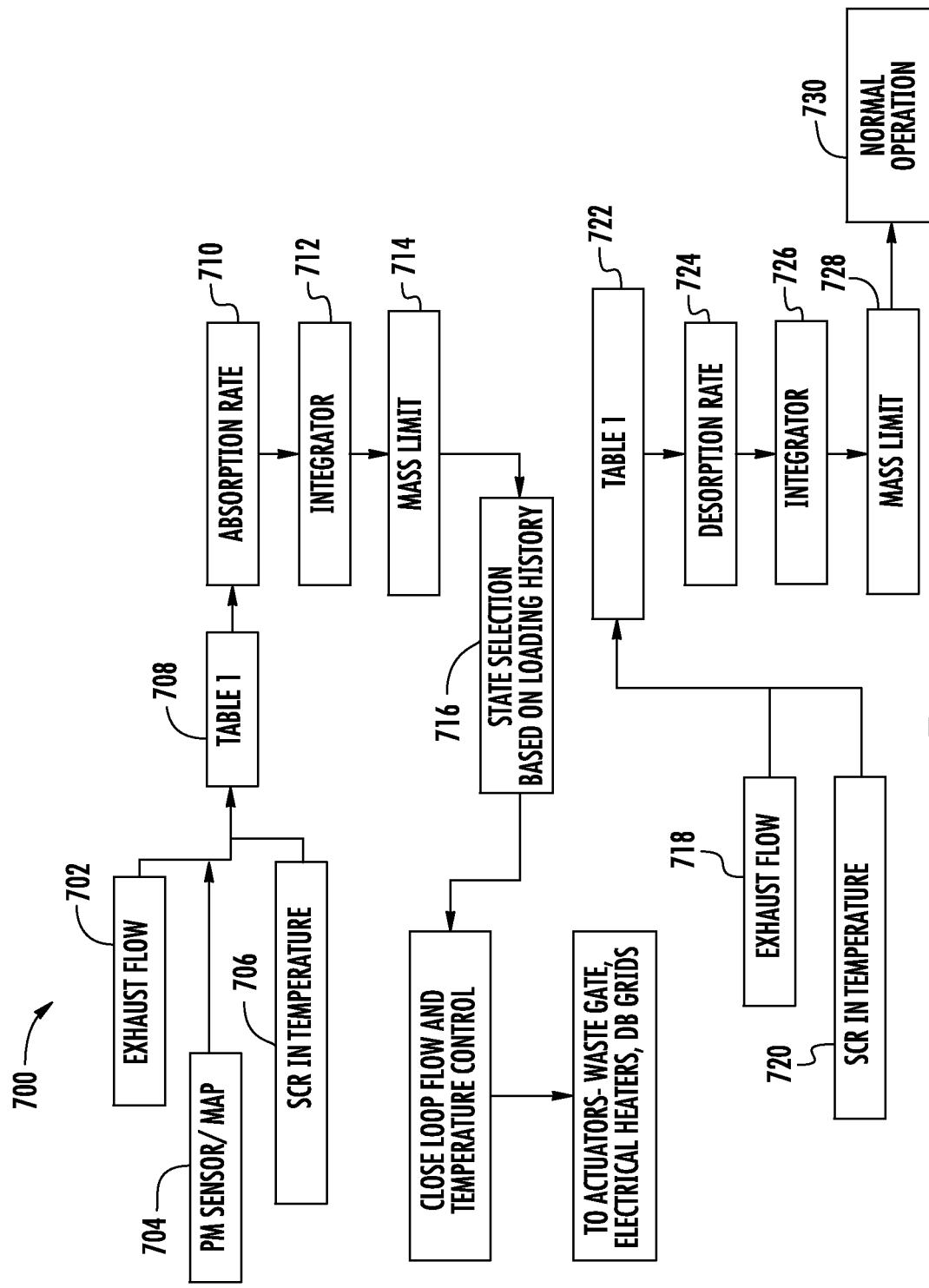
FIG. 7 is still yet another flow diagram of a method for reducing particulate matter deposits in an exhaust aftertreatment system, according to an example embodiment.

Referring now to FIG. 7, a method 700 is shown, which substantially similar to method 600 except for process 704. In this regard, process 702 is analogous to 602, 706 is analogous to 604, 708 is analogous to 606, 710 is analogous to 608, 712 is analogous to 610, 714 is analogous to 610, 716 is analogous to 614, 718 is analogous to 616, 720 is analogous to 618, 722 is analogous to 620, 724 is analogous to 622, 726 is analogous to 624, 728 is analogous to 626, and 730 is analogous to 628. Relative to method 600, the data used to determine the adsorption rate is different in method 700 than method 600. In method 600, exhaust flow and SCR inlet temperature are utilized. In method 700, exhaust flow, SCR temperature, and particulate matter data are utilized. Thus, method 700 shows the use of three data points to determine an adsorption rate.

Figure 8:
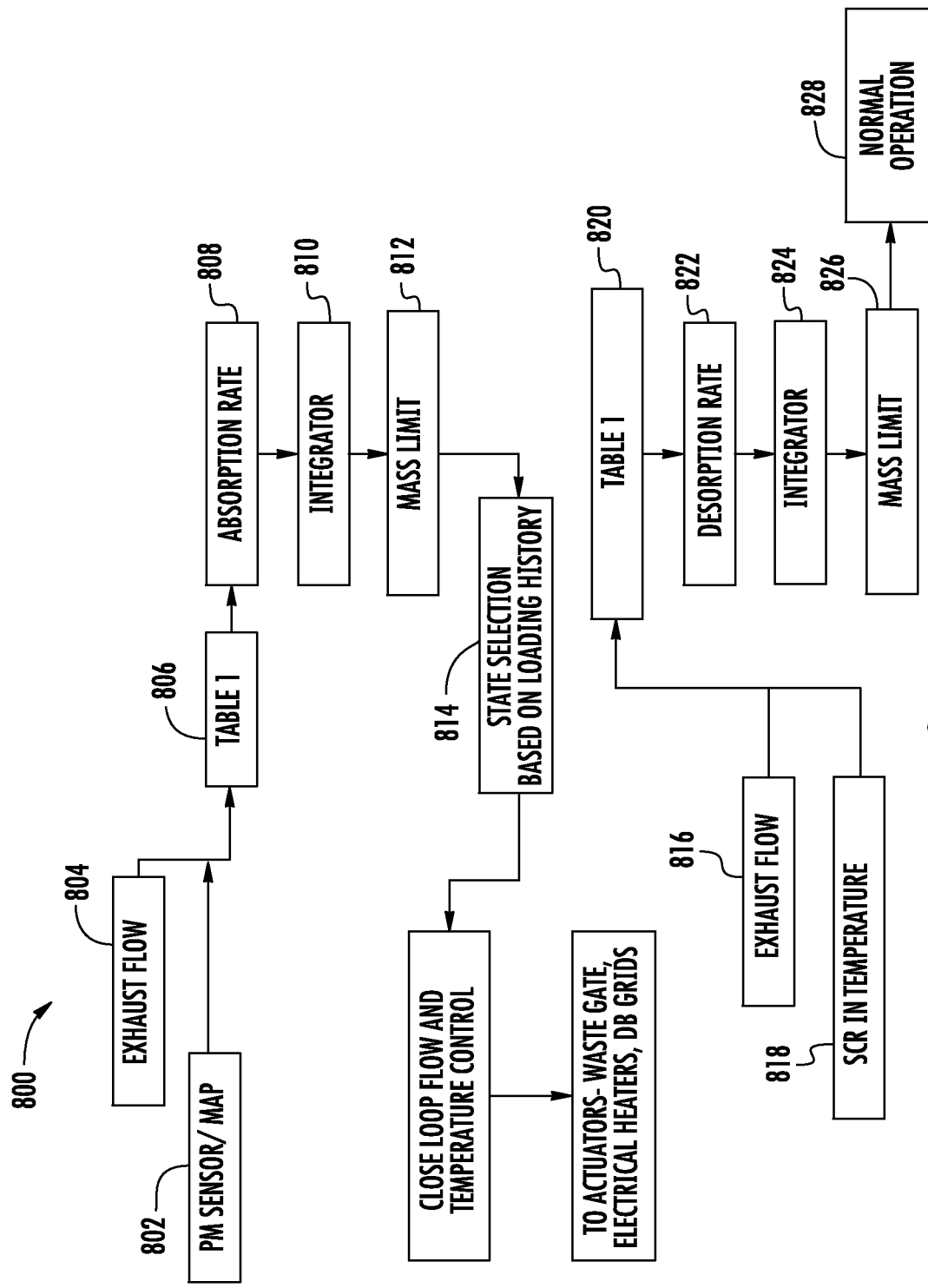
FIG. 8 is yet a further flow diagram of a method for reducing particulate matter deposits in an exhaust aftertreatment system, according to an example embodiment.

Referring now to FIG. 8, a method 800 is shown, which substantially similar to method 600 except for process 802. In this regard, process 804 is analogous to 602, 806 is analogous to 606, 808 is analogous to 608, 810 is analogous to 610, 812 is analogous to 612, 814 is analogous to 614, 816 is analogous to 616, 818 is analogous to 618, 820 is analogous to 620, 822 is analogous to 622, 824 is analogous to 624, 826 is analogous to 626, and 828 is analogous to 628. Relative to method 600, the data used to determine the adsorption rate is different in method 800 than in method 600. In method 600, exhaust flow and SCR inlet temperature are utilized. In method 800, exhaust flow and particulate matter data are utilized. In this regard, data regarding the rate of speed of exhaust flow and the amount of particulate matter is used to then correlate to an estimated or determined adsorption rate. In other words, the exhaust flow provides an indication of the speed of exhaust traveling through the aftertreatment system while the particulate matter data provides an indication of the amount of particulate matter (and/or soot) in the exhaust gas. Knowing the soot amount and rate, a table is utilized then estimate or determine the adsorption rate. In one embodiment, the exhaust flow and particulate matter data are determined at or approximately at the SCR inlet. In another embodiment, a different location in the aftertreatment system 130 is used to obtain the exhaust flow and particulate matter data. Thus, method 800 shows the use of two data points to determine an adsorption rate, whereby the two data points are different from that used in method 600.

Figure 9:
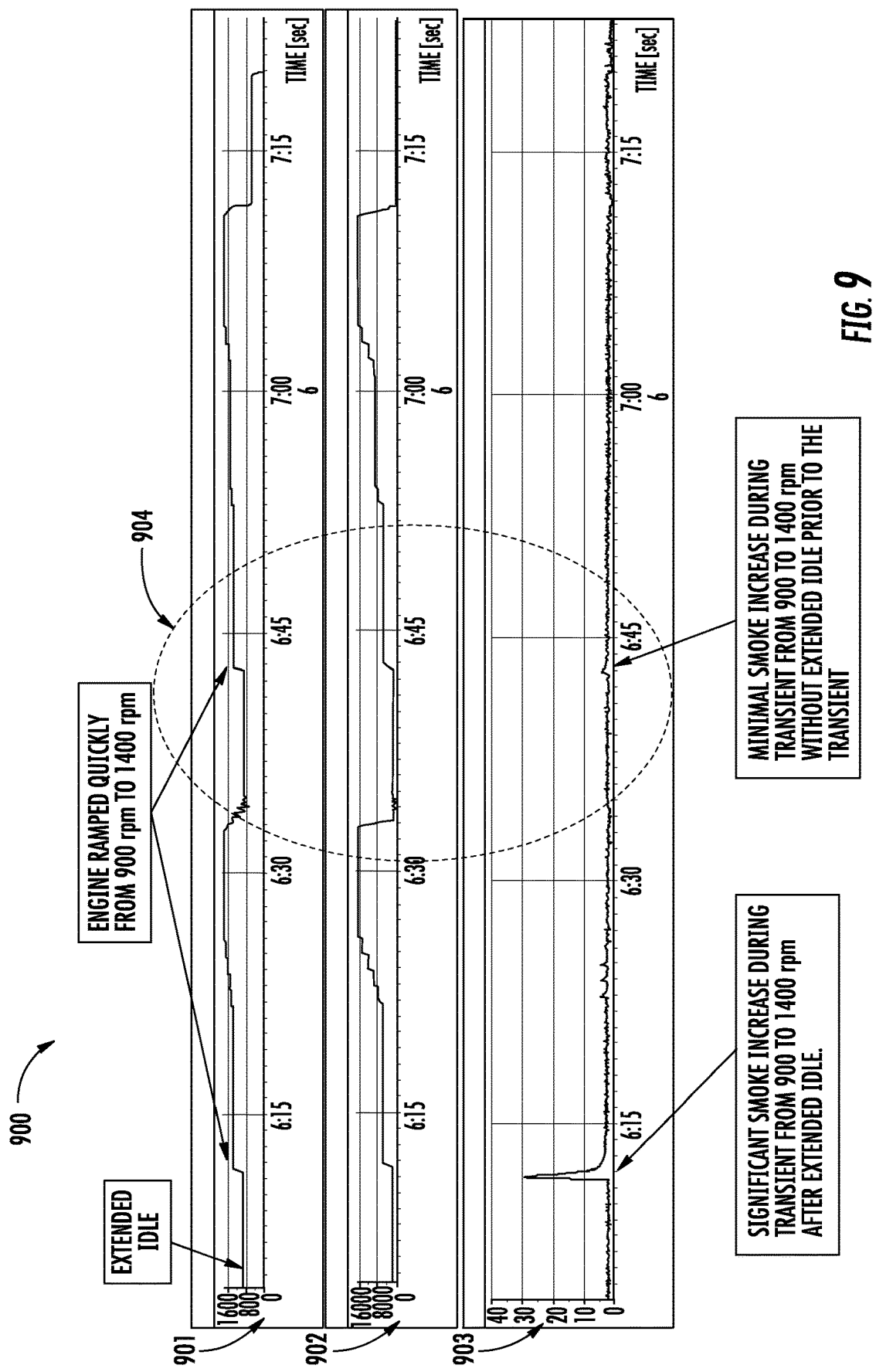
FIG. 9 are side-by-side images depicting the results of the systems and methods disclosed herein for reducing particulate matter deposits in an exhaust aftertreatment system versus an engine that does not utilize the systems and methods of the present disclosure, according to an example embodiment.

Based on the foregoing, referring now to FIG. 9, a graph 900 including graphs 901, 902, and 903 where graph 903 shows the result of the systems, methods, and apparatuses described herein is depicted, according to an example embodiment. Graph 901 represents engine speed versus time. Graph 902 represents engine torque versus time. Graph 903 represents smoke emissions versus time. With reference to Graph 903, after idling for prolonged periods at low loads soot accumulates in the exhaust piping. Still referencing Graph 903, when the engine is ramped from low speed and load to a higher speed and load the soot is released. The same operating procedure is then repeated and the higher than normal smoke is not seen on the repeat transient maneuver (shown by the circled part 904 of the test). Thus and beneficially, the systems, methods, apparatuses of the present disclosure work to reduce unsightly emissions in locomotives (and/or other vehicles and systems) that do not employ particulate filters.

It should be understood that no claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 2, it should be understood that the controller 150 may include any number of circuits for completing the functions described herein. For example, the activities and functionalities of one or more of the circuits may be combined in multiple circuits or as a single circuit. Additional circuits with additional functionality may also be included. Further, it should be understood that the controller 150 may further control other activity beyond the scope of the present disclosure.

As mentioned above and in one configuration, the "circuits" may be implemented in machine-readable medium for execution by various types of processors, such as processor 152 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
    receiving, by a controller, data regarding an exhaust gas flow rate of exhaust gas at a particular location and an amount of soot in the exhaust gas at the particular location in an exhaust aftertreatment system, wherein the particular location in the exhaust aftertreatment system is a selective catalytic reduction (SCR) inlet;
    determining, by the controller, an adsorption amount of soot in the exhaust aftertreatment system based on the exhaust gas flow rate of the exhaust gas at the particular location and the amount of soot in the exhaust gas at the particular location;
    comparing, by the controller, the adsorption amount of soot to a predefined adsorption amount limit;
    in response to the adsorption amount of soot exceeding the predefined adsorption amount limit, initiating, by the controller, an exhaust cleaning event to remove at least some accumulated soot in the exhaust aftertreatment system;
    receiving, by the controller, exhaust gas data during the exhaust cleaning event;
    determining, by the controller, a desorption amount of soot based on the exhaust gas data, wherein a buffer is applied to determine the desorption amount, and wherein the buffer is a predefined period of time the exhaust data is collected before the desorption amount of soot is determined;
    comparing, by the controller, the desorption amount of soot to a predefined desorption limit; and
    ceasing, by the controller, the exhaust cleaning event based on the comparison.

2. The method of claim 1, further comprising:
    receiving, by the controller, an indication that an engine has been operating in a low load condition for more than a predefined amount of time and determining the adsorption amount of soot in the exhaust aftertreatment system in response to the engine being operating in the low load condition for more than the predefined amount of time.

3. The method of claim 2, wherein the low load condition is an idle state for the engine.

4. The method of claim 3, wherein the low load condition corresponds with an engine speed of less than approximately 1300 RPM and the predefined amount of time is between approximately 4.5 hours and 8.5 hours.

5. The method of claim 1, wherein the exhaust cleaning event includes at least one of opening an exhaust valve, opening an intake air valve, or turning on an exhaust aftertreatment system heater.

6. The method of claim 1, further comprising:
    in response to the adsorption amount of soot exceeding the predefined adsorption amount limit by a predetermined value, initiating, by the controller, a first power demand state; and
    in response to the adsorption amount of soot exceeding the predefined adsorption amount limit by less than the predetermined value, initiating, by the controller, a second power demand state different from the first power demand state.

7. The method of claim 6, wherein the first power demand state is associated with a relatively greater power output from an engine coupled to the exhaust aftertreatment system than the second power demand state.

8. A non-transitory computer-readable media storing instructions therein that, when executed by at least one processor, causes the at least one processor to perform operations comprising:
    receiving data regarding an exhaust gas flow rate of exhaust gas at a particular location and an amount of soot in the exhaust gas at the particular location in an exhaust aftertreatment system, wherein the particular location in the exhaust aftertreatment system is a selective catalytic reduction (SCR) inlet;
    determining an adsorption amount of particulate matter in the exhaust aftertreatment system coupled to an engine based on the exhaust gas flow rate of the exhaust gas at the particular location and the amount of soot in the exhaust gas at the particular location;
    comparing the adsorption amount of particulate matter to a predefined adsorption amount limit;
    in response to the adsorption amount of particulate matter exceeding the predefined adsorption amount limit, initiating an exhaust cleaning event to remove at least some particulate matter from the exhaust aftertreatment system;
    receiving exhaust gas data during the exhaust cleaning event;
    determining a desorption amount of particulate matter based on the exhaust gas data, wherein a buffer is applied to determine the desorption amount, and wherein the buffer is a predefined period of time the exhaust data is collected before the desorption amount of soot is determined;
    comparing the desorption amount of particulate matter to a predefined desorption limit; and
    ceasing the exhaust cleaning event based on the comparison.

9. The computer-readable media of claim 8, wherein the exhaust cleaning event includes at least one of opening an exhaust valve, opening an intake air valve, or turning on an exhaust gas heater.

10. The computer-readable media of claim 8, wherein the instructions, when executed by the at least one processor, further cause operations comprising receiving data regarding operation of the engine that indicates operating in a low load condition for more than a predefined amount of time.

11. The computer-readable media of claim 10, wherein the exhaust cleaning event includes increasing a power output from the engine relative to a power output from the engine in the low load condition.

12. The computer-readable media of claim 11, wherein increasing the power output includes increasing a notch setting of the engine to a notch three setting or higher.

13. The computer-readable media of claim 8, wherein the instructions, when executed by the at least one processor, further cause operations comprising:
   in response to the adsorption amount of particulate matter exceeding the predefined adsorption amount limit by a predetermined value, initiating a first power demand state; and
   in response to the adsorption amount of particulate matter exceeding the predefined adsorption amount limit by less than the predetermined value, initiating a second power demand state different from the first power demand state.

14. The computer-readable media of claim 13, wherein the first power demand state is associated with a relatively greater power output from the engine than the second power demand state.

15. The computer-readable media of claim 8, wherein the instructions, when executed by the at least one processor, further cause operations comprising:
   retrieving a look-up table regarding the exhaust gas flow rate to determine an adsorption rate;
   determining the adsorption rate of particulate matter in the exhaust aftertreatment system based at least partly on the exhaust gas flow rate using the look-up table; and
   determining the adsorption amount of particulate matter based on the adsorption rate.

16. The computer-readable media of claim 15, wherein the instructions, when executed by the at least one processor, further cause operations comprising utilizing at least one of a determined particulate matter amount and an inlet temperature regarding a selective catalytic reduction device in the exhaust aftertreatment system in combination with the exhaust gas flow rate in the look-up table to determine the adsorption rate.

17. A system, comprising:
   a controller coupled to an engine and an exhaust aftertreatment system, the controller comprising at least one processing circuit comprising at least one memory coupled to at least one processor, the controller structured to:
      receive data regarding an exhaust gas flow rate of exhaust gas at a particular location and an amount of soot in the exhaust gas at the particular location in an exhaust aftertreatment system, wherein the particular location in the exhaust aftertreatment system is a selective catalytic reduction (SCR) inlet;
      determine an adsorption amount of particulate matter in the exhaust aftertreatment system based on the exhaust gas flow rate of the exhaust gas at the particular location and the amount of soot in the exhaust gas at the particular location;
      compare the adsorption amount of particulate matter to a predefined adsorption amount limit;
      in response to the adsorption amount of particulate matter exceeding the predefined adsorption amount limit, initiate an exhaust cleaning event to remove at least some accumulated particulate matter in the exhaust aftertreatment system;
      receive exhaust gas data during the exhaust cleaning event;
      determine a desorption amount of particulate matter based on the exhaust gas data, wherein a buffer is applied to determine the desorption amount, and wherein the buffer is a predefined period of time the exhaust data is collected before the desorption amount of soot is determined;
      compare the desorption amount of particulate matter to a predefined desorption limit; and
      cease the exhaust cleaning event based on the comparison.

18. The system of claim 17, wherein the exhaust aftertreatment system does not include a particulate filter.

19. The system of claim 17, wherein the controller is further structured to receive data regarding operation of an engine coupled to the exhaust aftertreatment system indicating that the engine is operating in a low load condition for more than a predefined amount of time.

20. The system of claim 17, wherein the exhaust cleaning event includes at least one of opening an exhaust valve, opening an intake air valve, or adjusting operation of a turbocharger to increase a flow rate of exhaust gas through the exhaust aftertreatment system.

* * * * *